Sept. 2, 1969  R. A. WILLIAMS  3,464,416

SLEEP INDUCING METHOD AND HEADPIECE

Filed Aug. 25, 1967  3 Sheets-Sheet 1

INVENTOR.
Robert A. Williams
BY Wm. T. Wofford
Attorney

Sept. 2, 1969  R. A. WILLIAMS  3,464,416
SLEEP INDUCING METHOD AND HEADPIECE
Filed Aug. 25, 1967  3 Sheets-Sheet 2

INVENTOR.
Robert A. Williams
BY Wm. T. Wofford
Attorney

United States Patent Office 3,464,416
Patented Sept. 2, 1969

3,464,416
SLEEP INDUCING METHOD AND HEADPIECE
Robert A. Williams, Fort Worth, Tex., assignor to Williams Instruments, Inc., Fort Worth, Tex.
Continuation-in-part of application Ser. No. 408,895, Nov. 4, 1964. This application Aug. 25, 1967, Ser. No. 668,280
Int. Cl. A61m 21/00; A61n 1/02
U.S. Cl. 128—410                10 Claims

ABSTRACT OF THE DISCLOSURE

A method and apparatus whereby electrical energy is transmitted through the head to induce sleep by placing electrodes on the infraorbital ridges and on the rear region of the head. The apparatus disclosed for positioning the electrodes against the infraorbital ridges includes an arcuate band extending fore and aft over the head to support a rear electrode and a forehead clamp. A shaft is slidably and adjustably mounted to the band to extend downward along the nose region of the face and a pair of rods are radially and rotatably mounted to the shaft for pivotally supporting the infraorbital electrodes. The electrodes have a yieldable plate, preferably foraminous, core to assume an infraorbital ridge facial contour, being covered with electrically conductive nonmetallic materials such as silicone rubber. An electric circuit connected across the infraorbital and rear electrodes provides pulsating current and voltage selected from range subsequently defined.

This application is a continuation-in-part of a previously filed application, Ser. No. 408,895, filed Nov. 4, 1964, now abandoned.

BACKGROUND AND GENERAL DISCUSSION

Previously, it has been discovered that the passage of certain types of electrical currents through the head is frequently beneficial in reducing fatigue. A deep sleep is often induced by this technique, and in many instances the apparent equivalent of eight hours sleep may be achieved in two hours or less. This general area of electrotherapy treatment is commonly known as the "electrosleep" technique.

Electrodes must be placed and immovably retained upon selected regions of the head during the use of the electrosleep technique, since shifting of the electrodes during treatment may awaken the user. Various of headpieces for securing the electrodes to the head have been previously proposed. One of the most common types of headpieces utilizes a pair of sponge electrodes that are moistened with a saline solution and retained over the eyes by a metallic cup. Another electrode is placed at the rear of the head, usually at the occipital region. Such devices have a number of disadvantages, the major one being perhaps the blurred vision which results from exerting a sustained pressure directly against the eye. The blurred vision may last for as long as thirty minutes after the termination of the treatment. In addition, some persons have eyes which are especially sensitive to and irritated by electrical currents. Moreover, one disadvantage found in all prior art electrosleep headpieces of which I am aware is that their construction will not allow the wearer to comfortably alter the position of his head. If the mechanical pressure which holds the electrodes against the head is changed, then the electrical resistance between each electrode and the head is also changed. Changing the electrical resistance and thus the current flow through the head is often irritating and may arouse the wearer of the headpieces. Moreover, the prior art headpieces do not permit adjustment of the electrode pressure exerted against the head independently of the clamping pressure that secures the headpiece to the head. Maximum comfort can only be achieved by providing a headpiece wherein there are means for adjusting the electrode pressure exerted against the front parts of the head without tightening or loosening the headpiece.

It is the general object of my invention to provide an improved headpiece apparatus for use by those persons who are to undergo electrically induced sleep.

Another object of my invention is to provide an improved electrosleep headpiece apparatus wherein means are provided for adjusting the pressure the front electrodes exert against the head, without the necessity for tightening or loosening the headpiece itself.

Another object of my invention is to provide an improved headpiece apparatus for use in the electrosleep technique, said apparatus being capable of providing a constant pressure between the electrodes and the head even when the user changes position widely.

Another object of my invention is to provide an improved electrode for use in the electrosleep technique.

Another object of my invention is to provide an improved electrosleep headpiece apparatus wherein the front electrodes are improved and placed in an improved position on the head. Apparatus conforming to the above objects is utilized in practicing a method of inducing sleep electrically in which pulsating current is passed through the head in the vicinity of the infraorbital foramen and eyes so as not to interfere with normal vision. Moreover, the peak to peak current and voltage lie in selected ranges compatible with the nerve system impulse pattern.

It is accordingly another object of my invention to provide an improved electrosleep method.

BRIEF DESCRIPTION OF THE DRAWINGS

FIG. 5 is a fragmentary side elevational view of the swivel arrangement of FIGS. 1, 2, and 3 which helps support the infraorbital electrodes.

FIG. 6 is a fragmentary sectional view as seen looking along the lines VI—VI of FIG. 5.

DESCRIPTION OF PREFERRED EMBODIMENTS

Figure 1:
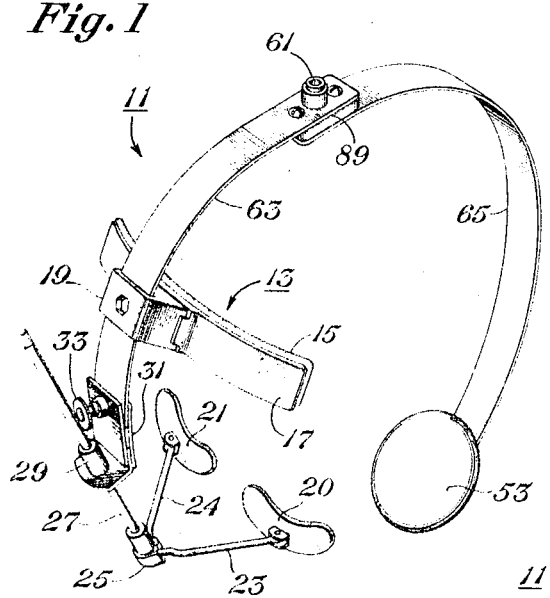
FIG. 1 is a perspective view of a headpiece apparatus constructed in accordance with the principles of my invention.
Figure 2:
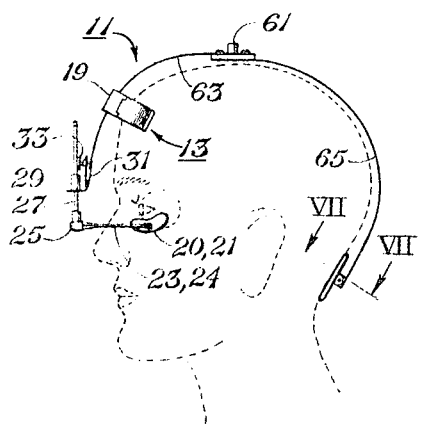
FIG. 2 is a side elevational view showing the headpiece apparatus of FIG. 1 in position on the head.

Referring now to the drawings and initially to FIGS. 1 and 2, the numeral 11 designates an arcuate band that extends from the forehead to approximately the occipital regions of the head. This band is preferably formed of stainless spring steel so that it is electrically conductive and mechanically biased so that its end portions are urged toward the head. The primary purpose of the band is to support electrodes as will be explained in detail later. The band 11 need not be formed of stainless steel, however, or even of metal so long as there is provided means for conducting electricity to the electrodes and means for urging the band end portions toward the forehead and occipital regions of the head. At a forward portion of the band 11 is a head clamp 13 that is transversely mounted on the band. This head clamp has a padding of foam rubber 15 or equivalent that is mounted on the back of an arcuate member 17 which is formed of a rigid material, preferably of a plastic such as polycarbonate. Attachment means are provided in a housing 19 to secure the arcuate member 17 to the band 11.

Depending from the forward end of the band 11 are infraorbital electrodes 20, 21 which are pivotally secured to horizontal adjustment rods 23, 24 that extend from a swivel 25. The swivel in turn is connected to a vertical adjustment shaft 27 that in turn is connected to a friction slide 29. The friction slide 29 is securely mounted to a housing 31 that is secured to the band 11. The angle of the housing 31 may be changed with respect to the band 11 by turning a pressure adjustment wheel 33. Thus, the pressure exerted by the electrodes 20, 21 against the face may be conveniently adjusted.

As may be seen more clearly by referring to FIGS. 5 and 6, the swivel 25 is rotatably mounted to the vertical adjustment rod 27 and is secured thereto by means of a snap ring 35, which engages suitable grooves (see FIG. 5) in the swivel 25 and rod 27. The horizontal adjustment rods 23, 24 are wrapped around the rod 27 and protrude from a covering 37. There is preferably some degree of interference between the rod 27 and the wrapped portion of each rod 23, 24 so that the rods are securely held in selected positions. Thus it is apparent that the infraorbital electrodes may be spaced apart a distance that suits the person using the headpiece.

Figure 4:
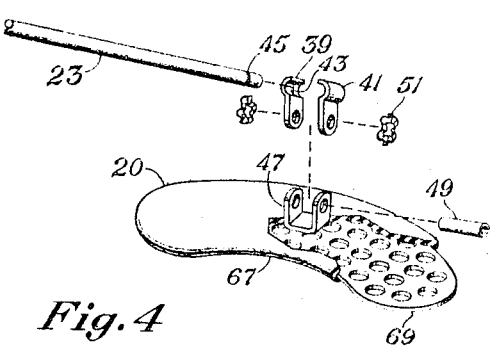
FIG. 4 is a fragmentary perspective view which shows a preferred construction of those electrodes shown in FIGS. 2 and 3 and hereinafter referred to as the "infraorbital" electrodes.

Referring now to FIG. 4, it may be seen that the horizontal adjustment rods 23, 24 are preferably universally secured to the infraorbital electrodes 20, 21. This helps provide a uniformly distributed pressure at all times between the infraorbital electrode and the infraorbital region of the face. As is shown in FIG. 4, the horizontal adjustment rod 23 extends between a pair of clamps 39, 41 and ridges 43 on the clamps engage a groove 45 in the rod. This enables the clamp to rotate with respect to the rod but prevents the rod from slipping from the clamps. The clamps 39, 41 are secured to the bracket 47 on electrode 20 by means of a spring pin 49 which extends through bracket 47, through the undulated spring washers 51, and through the clamps 41, 43. Thus, the similarly constructed electrodes 20, 21 may be adjusted radially by moving the horizontal adjustment rods 23, 24, with respect to the vertical rod 27; they may be adjusted vertically by moving the vertical adjustment rod 27 with respect to the friction slide 29; and they may be angularly oriented by both rotating and pivoting them with respect to the horizontal adjustment rods 23, 24.

Figure 7:
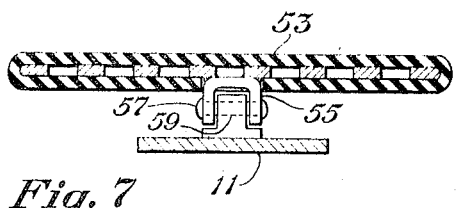
FIG. 7 is a fragmentary sectional view as seen looking along the lines VII—VII of FIG. 2.

As stated previously, the arcuate band 11 extends rearwardly to the occipital region of the head and electrode 53 is pivotally mounted to the end portion of the band 11. The construction of the occipital electrode 53 of FIGS. 1 and 2 is shown more clearly in the fragmentary sectional view of FIG. 7. There it may be seen that the electrode 53 is secured to a bracket 55 which is pivotally mounted by means of a pivot pin 57 to the protrusion 59 that extends from the band 11. Thus, the occipital electrode 53 is capable of adapting to the particular contour of the head of its user. A suitable electrical circuit (not shown) is connected to the input jack 61 on the arcuate band as may be seen clearly in FIGS. 1 and 2. The band 11 is actually formed in two pieces, having a forward section 63 and a rearward section 65 which are insulated from each other. The electrical circuit is arranged so that the occipital electrode 53 is the negative electrode while the infraorbital electrodes 20 and 21 are the positive electrodes.

The construction of the electrodes is such that the need for saline solution filled sponge electrodes is eliminated. As may be seen clearly in FIG. 4, the exterior 67 of each electrode is formed of a nonmetallic conductive material such as silicone rubber while the interior of each electrode is formed of a foraminous metallic conductor such as perforated sheet metal or screened metal sheet. The metal and nonmetallic materials are molded together and thus intimate contact is maintained between the rubber and the metal, a feature which eliminates any adhesion factor and maintains equal distribution of the current over the entire area of the electrode even during the most adverse conditions. In use, the exterior 67 of each electrode is initially moistened but afterwards, no further care is needed since skin moisture has been found sufficient to maintain a constant resistance between the electrode and the skin tissue. A successfully used nonconductive material was silicone rubber having a volume resistivity of approximately 15 ohm-centimeter and a durometer Shore scale hardness of 40 to 80. Silicone was selected because of its inert characteristics but conductive rubber proper and conductive plastic may also be used. The above construction of the electrodes maintains equal distribution of current, as stated previously, and allows the electrodes to be bent, formed or reformed to conform to individual facial configurations.

I have discovered that the shape of the infraorbital electrodes 20, 21 can be helpful in achieving maximum effectiveness. The use of electrodes that engage the infraorbital region of the head is of itself a significant improvement, but if the infraorbital electrodes are properly shaped, even greater advantages are achieved. One purpose in providing infraorbital electrodes is to eliminate the necessity for placing electrodes over the eyes, since over-the-eye electrodes have the heretofore mentioned disadvantages. And yet it has been found advantageous to have the electrical current pass into the head in the region of the eyes. My infraorbital electrodes rest on the infraorbital bone structure of the head and thus do not exert a direct pressure on the eyes. This is more comfortable than using electrodes that cover the eyes and exert pressure thereon. The upper edge of each infraorbital electrode 20, 21 is curved to the approximate contour of the infraorbital edge of the bone structure. Consequently, my electrodes enable the current to pass into the head in the region of the eyes and yet do not cover or exert a direct pressure on the eyes. The lower edges of the electrodes are preferably curved also so that the electrodes have a kidney shape, since this shape conforms to the facial contour of most persons. But this is not essential since the construction of the electrodes enables them to be bent to match the contour of the face. Thus, many shapes may be used along the lower edges of the infraorbital electrodes.

Figure 3:
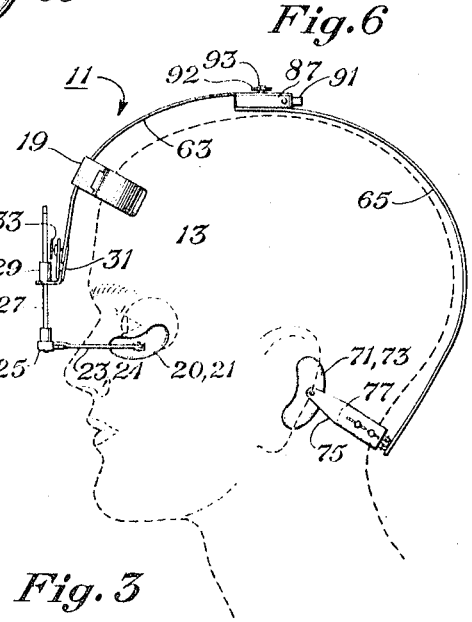
FIG. 3 is a side elevational view of a modified form of my invention.

In FIGS. 1 and 2 the rear electrode is of a type that is adapted to engage the occipital region of the head. In FIG. 3, however, the rear electrodes 71, 73 are kidney-shaped (like the infraorbital electrodes) and are adapted to engage the mastoidal region of the head. In this instance an arcuate cross member 75 is rotatably mounted to the rear portion 65 of band 11. The extremities of the arcuate band 75 are formed of separate pieces and are adjustably and slidably mounted to a central piece 77. When I intend to refer to either the occipital or mastoidal regions of the head, I specify the "rear" portions of the head.

Figure 8:
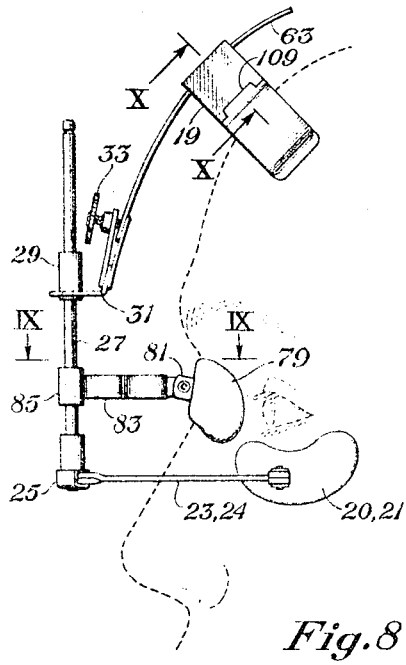
FIG. 8 is a fragmentary side elevational view showing a modified form of my invention.

I have discovered that in some instances, the nose bridge electrode 79 of FIG. 8 is quite effective, especially when those persons using the apparatus have a high degree of sensitivity in their upper tooth region. In such instances the nose bridge electrode 79 is used singly or in combination with the infraorbital electrodes 20 and 21.

Figure 9:
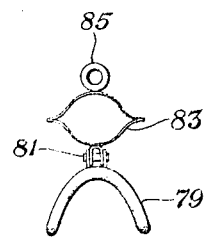
FIG. 9 is a view as seen looking along the lines IX—IX of FIG. 8.

This electrode is pivotally mounted at 81 to the spring 83 as is perhaps shown more clearly in FIG. 9. The spring 83 is attached to a housing 85 which is slidably mounted on the vertical adjustment rod 27. The use of the nose bridge electrode 79 is beneficial since it diffuses the flow of electrical energy over a wider region of the head and thus eliminates the discomfort which sometimes arises in sensitive persons by concentrating the flow of electrical energy.

Figure 11:
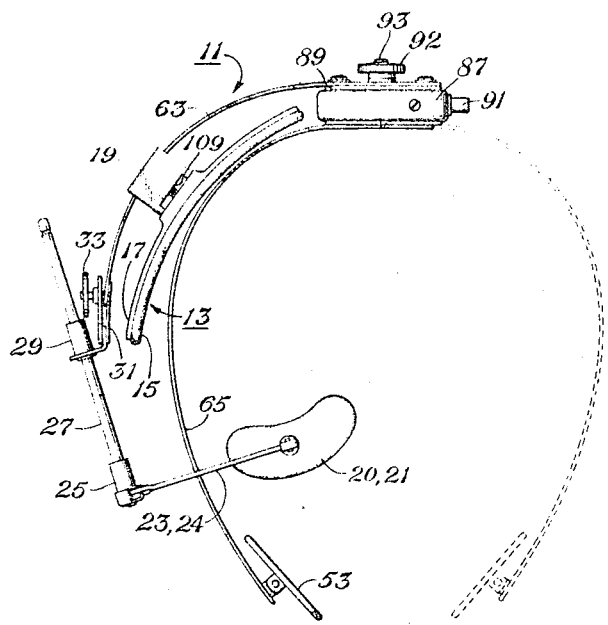
FIG. 11 illustrates another modified form of my headpiece apparatus.

In the apparatus of FIGS. 1 and 2, an external electric circuit is used and is attached to the head band 11 by means of the input jack 61. However, my headpiece apparatus is capable of adaptation as a completely portable unit by the inclusion of a miniaturized electrical circuit of a suitable type within the headpiece itself. In this instance the housing 87 of FIG. 11 is interposed between the rear portion 65 and the front portion 63 of the band 11. Bands 63 and 65 are electrically insulated by the pad of insulation 89 that separates the forward band 63 and the housing 87. (The bands 63, 65 of the FIG. 1 headpiece are also insulated by a suitable pad 89.) The housing 87 has an input jack 91 for connection to a source (not shown) of electrical energy. In order to make the headpiece more compact during transportation, the rear band 65 is pivotally mounted in housing 87. The thumb screw 92 is connected to a shaft 93 that extends through the housing and joins the rear band 65. Thus, when the thumb screw is loosened the band 65 may be rotated from the operational position shown in phantom in FIG. 11 to the position shown in heavy lines. Also, the infraorbital electrodes 20, 21 and their horizontal adjustment rods 23, 24 may be swung together since they are pivotally mounted to the vertical adjustment rod 27. In addition, the head clamp 13 may be rotated from the transverse position shown in FIG. 3 to the FIG. 11 position. As a consequence, the headpiece occupies very little space and may thus be transported very easily.

Figure 10:
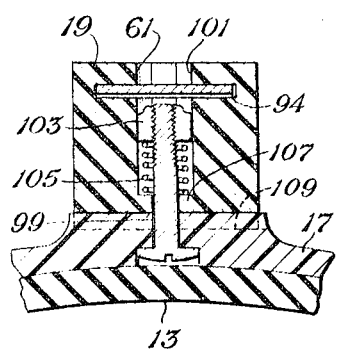
FIG. 10 is a fragmentary sectional view as seen looking along the lines X—X of FIG. 8.

The construction of the head clamp 13 may be seen quite clearly in FIGS. 8, 10, and 11. The housing 19 has a slot 94 therein, and the front portion 63 of band 11 interferingly engages this slot so that the head band may be moved and retained in a desired position on the band. The arcuate and rigid backing 17 is pivotally secured to the housing 19 by means of the screw 97 which extends through a hole 99 in the rigid backing 17 and into an aperture 101 in the housing 19. A nut 103 is secured to the screw 75 and a spring 105 is interposed between the bottom nut 103 and an annular ledge 107 in the housing 19. Thus, the rigid backing of the head clamp is urged against the housing 19, and elongated slot 109 (see particularly FIG. 11) is included in housing 19 so that when the head clamp is moved to its operational position, a portion of the rigid member 17 engages the slot to prevent rotation of the head clamp.

Figure 12:
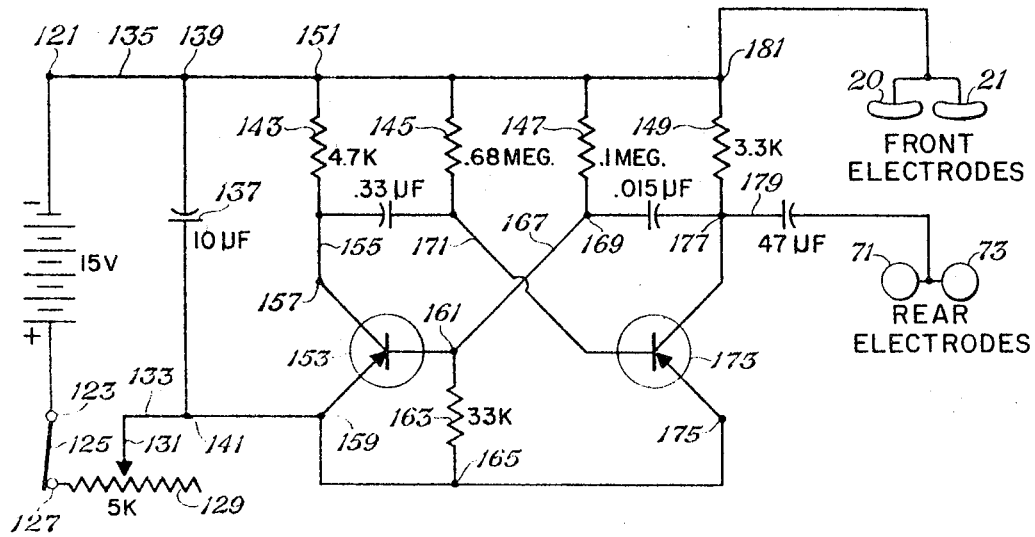
FIG. 12 is a schematic diagram of a suitable electric circuit that may be utilized in practicing my sleep inducing method.

Illustrated in FIG. 12 is a circuit suitable for transmitting sleep inducing electrical energy through the head. In this instance a fifteen volt power source is connected across terminals 121, 123, the latter being connected with a single pole, single throw switch 125 having a terminal 127 connected with a five kilohm, two terminal rheostat 129, the variable contact terminal 131 of which is connected to a conductor 133. Terminal 121 communicates with a conductor 135 and a ten microfarad capacitor 137 is connected in series with the battery to the conductors 133, 135. Connected in parallel with the battery and the capacitor 137 across the conductors 133, 135 are four resistors 143, 145, 147, and 149, preferably having ratings of respectively 4.7 kilohms, .68 megohm, .1 megohm and 3.3 kilohms. Resistor 143 communicates with conductor 135 through terminal 151 and is connected in series with a 400 milliwatt transistor 153 through a conductor 155 and the collector 157. The emitter 159 of the transistor communicates with conductor 133 while its base 161 is connected in series with a 33.0 kilohm resistor 163 that is connected with the conductor 133 through terminal 165. Terminal 161 is connected through a conductor 167 with a terminal 169 which in addition is one terminal of resistor 147. Connected in series with the resistor 145 through its base 171 is a 400 milliwatt transistor 173 having its emitter 175 connected with the conductor 133 and its collector 177 connected with a conductor 179 that extends between terminal 169 and the rear electrodes 71, 73, such conductor having inserted therein a .015 microfarad capacitor between terminal 169 and collector 177, and also a forty-seven microfarad capacitor between the collector 177 and the rear electrodes 71, 73. Conductor 135 extends to the front electrodes 20, 21 from the terminal 181 connected with the resistor 149.

The above circuit provides a selected voltage across the front and rear electrodes. The measured value for the resistance to electric current in the head of an average person is about 3000 ohms. The current flow through the head when using twelve volts is four milliamps. The frequency of the pulse variations has been established to be preferably thirty-six cycles per second, which appears to be satisfactory for most persons. It has been determined from the alpha patterns as shown on electroencephalograms that the frequency of the pulsations in the average nerve system varies between nine and twelve cycles per second. Possibly, best results are obtained by using a multiple of a particular person's alpha pattern frequency, which may explain why thirty-six cycles per second works well on most persons whose nerve system registers about twelve cycles per second on an electroencephalogram. This has not been demonstrated, however, with certainty and seemingly there is considerable variation in the frequency that may be successfully utilized. Even on a single patient the frequencies that may be used with comfort to satisfactorily induce sleep may vary.

Voltages that may be satisfactorily utilized vary since persons demonstrate varying ability to tolerate comfortably electric current. For most persons, however, voltage selected from a range from two to eighteen volts and a current in a range from 0.67 to 6.0 milliamps is satisfactory, with the preferred current and voltage being respectively four milliamps and twelve volts. The above ranges of current and voltage may be used to satisfactorily perform my method of electrically inducing sleep wherein the electrodes are placed on the infraorbital ridge. Current and voltage values referred to herein are peak values and not average values unless so specified.

In operation the band 11 is placed over the head so that occipital 53 or mastoidal electrodes 71, 73 engage rear portions of the head while the head clamp 13 engages the forehead. Head clamp 13 is slipped along the front portion 63 of the band 11 to a comfortable position. The horizontal adjustment rods 20, 21 are moved radially and the vertical adjustment rod 27 is moved vertically along friction slide 29 until the infraorbital electrodes 20, 21 are placed on the infraorbital regions of the head. The above adjustment means allow the electrodes 20, 21 to be adapted to essentially any facial configuration. The upper curved surface of the electrodes is positioned to match the edge of the infraorbital base structure and are close to the eyes and yet do not exert an uncomfortable pressure thereon. The pressure adjustment means, which consist of the pivotable housing 31 and its adjustment wheel 33 (both of which are mounted on the end portion of front band 63), is adjusted so that the pressure exerted by the infraorbital electrodes against the face suits the person using the headpiece. Then input jack 61 or 91 is connected to a suitable source of electrical energy while the person is in a sitting or prone position.

When using a circuit like that shown in FIG. 12, a supply voltage of fifteen volts is utilized, with the voltage supplied to the electrodes being regulated through the five kilohm rheostat 129. The setting of this resistor is established initially such that voltage across the electrodes is minimized. If the user demonstrates that he is suffering no irritation, the voltage across the electrodes is increased until preferably four milliamps of current is reached. The voltage across the electrodes may be increased to the desired degree until irritation develops. When such irritation develops, the electrode voltage is decreased to a non-irritating level. Experience indicates that twelve volts and therefore about four milliamps is not irritating to a majority of users and will satisfactorily induce sleep. It is therefore common to establish the voltage at about the twelve level without need for testing for the irritation level of the current flow. Using the above method, sleep may be induced for thirty minutes to one hour and the effect in most instances on the user is like receiving a full seven to eight hours of sleep.

It should be apparent from the foregoing that I have provided electrotherapy treatment headpiece apparatus having significant advantages. The provision of electrode adjustment means for those electrodes that engage sensitive regions of the head, such as the regions around the nose and eyes, is a significant advantage, especially since the adjustment means functions independently of the clamping means used to secure the headpiece to the head. Thus, there is no need to loosen or tighten the headpiece when adjustments (such as pressure adjustments) need to be made. The use of a band that extends fore-and-aft over the head with the need for only two pressure points (head clamp 11 and occipital electrode 53, for example) permits the person using the headpiece to vary his position widely. He may lie with either side or the back of his head down without interfering with the positioning of the headpiece. He may not, of course, lie with his face down since the electrode and pressure adjustment means extend forwardly from the headpiece, but people rarely try to sleep with their faces down. The improved electrodes are particularly advantageous since their construction eliminates the need for assistance from such things as saline solutions and since their construction permits them to be bent to conform to individual facial configurations without disrupting the even distribution of current flowing through the electrodes. In addition, the contour of the infraorbital electrodes (with their curved upper edges that conform to the approximate contour of the infraorbital edges of the bone structure) permits the passage of electrical current into the head in the region of the eyes without the necesstiy for covering the eyes with electrodes. As was explained previously, covering the eyes with electrodes leads to a number of disadvantages. Moreover, the use of an electrode that engages the nose bridge enables a wider diffusion of electrical current through the head and eliminates the discomfort that accompanies the concentration of electrical currents in small regions of the heads of sensitive persons. Also, the use of electrodes that engage the infraorbital region of the head is a significant improvement of itself since good results are obtained and yet the disadvantages which accompany the use of eye engaging electrodes are eliminated.

The above described method of electrically inducing sleep is effected in a manner avoiding eye irritation. It is seemingly possible to utilize current and voltage levels over a wide range in most persons but the preferred levels described appear to work satisfactory for the average person. There are a variety of circuits which may be utilized to produce frequency, current and voltage in the above ranges and it is seemingly possible to utilize alternating currents in those ranges in addition to using pulsating direct current, although it appears pulsating direct current is the most satisfactory.

The foregoing disclosure and the showings made in the drawings are merely illustrative of the principles of this invention and are not to be interpreted in a limiting sense.

I claim:

1. An apparatus for holding electrodes in selected positions on the head of a person who is to undergo electrically induced sleep, said apparatus comprising:
   an arcuate band having a length sufficient to extend from the forehead region to the rear of the head, said band being biased to urge its end regions toward the head;
   at least one electrode mounted on one end of said band to engage the rear region of the head;
   an arcuate, insulated clamp mounted toward an opposite end of said band to engage the forehead region of the head;
   a shaft slidably and adjustably mounted to said band beneath said arcuate clamp to extend downward a selected distance along the nose region of the face;
   a pair of rods mounted radially to said shaft and being radially adjustable relative to said shaft;
   an electrode pivotally mounted to each rod to engage the infraorbital ridge of the face adjacent but not upon the eye and above those regions of the face overlying the mouth cavity;
   means electrically connecting said electrodes across an electrical energy power source;
   said electrodes having a yieldable plate core capable of being selectively and repetitively bent and shaped to assume an infraorbital ridge facial contour, and having a covering of electrically conductive non-metallic material such as silicone rubber.

2. The apparatus defined by claim 1 wherein said infraorbital electrodes have arcuate upper peripheral edges that conform to the shape of the eye to facilitate the passage of current into the eye.

3. The apparatus defined by claim 1 wherein another electrode extends from said band to engage the nose bridge.

4. An apparatus for holding electrodes in selected positions on the head of a person who is to undergo electrically induced sleep said apparatus comprising:
   an arcuate band having a length sufficient to extend from the forehead region to the rear of the head;
   at least one electrode mounted on one end of said band to engage the rear region of the head;
   clamping means mounted toward an opposite end of the band to engage the forehead region of the head;
   support means mounted to said band beneath said clamp means to extend downward a selected distance along the nose region of the face;
   a pair of rods pivotally mounted to said support means;
   an electrode pivotally mounted to each rod to engage the infraorbital ridge of the face adjacent but not upon the eye;
   means for supplying current to said electrodes in a range varying from two to eighteen volts and at a current level from 0.6 to 6.0 milliamps.

5. The apparatus defined in claim 4 in which said voltage is approximately twelve volts and the current is approximately four milliamps.

6. The method for inducing sleep electrically, said method comprising the steps of:
   securing electrodes against the infraorbital ridge of the face adjacent but not upon the eyes and above those regions of the face overlying the mouth cavity;
   securing at least one additional electrode of opposite polarity against a rear region of the head;
   passing an electric current between said electrodes of current sufficient to induce sleep;
   said current having a voltage in a range from two to eighteen volts and at a current level from 0.6 to 6.0 milliamps.

7. The method defined by claim 6 wherein said voltage is about twelve volts and the current is about four milliamps.

8. The method for inducing sleep electrically, said method comprising the steps of:
   securing electrodes against the infraorbital ridge of the face adjacent but not upon the eyes and above those regions of the face overlying the mouth cavity;

securing at least one additional electrode of opposite polarity against a rear region of the head;

passing an electric current between said electrodes of a character sufficient to induce sleep.

9. An apparatus for holding electrodes in selected positions on the head of a person who is to undergo electrically induced sleep said apparatus comprising:

an arcuate band having a length sufficient to extend from the forehead region to the rear of the head;

at least one electrode mounted on one end of said band to engage the rear region of the head;

clamping means mounted toward an opposite end of the band to engage the forehead region of the head;

support means adjustably mounted to said band beneath said clamp means to extend downward a selected distance along the nose region of the face;

a pair of rods radially and pivotally mounted to said support means;

an electrode pivotally mounted to each rod to engage the infraorbital ridge of the face adjacent but not upon the eye;

means connecting said electrodes with a source of current of a character sufficient to induce sleep.

10. The method for inducing sleep electrically, said method comprising the steps of:

securing electrodes against the infraorbital ridge of the face adjacent but not upon the eyes;

securing at least one additional electrode of opposite polarity against a rear region of the head;

passing an electric current between said electrodes of a character sufficient to induce sleep.

References Cited

UNITED STATES PATENTS

| | | | |
|---|---|---|---|
| 768,721 | 8/1904 | Bassell | 128—410 |
| 1,766,471 | 6/1930 | Van Dusen. | |
| 1,849,745 | 3/1932 | Hoffman | 128—410 |
| 3,044,151 | 7/1962 | Coler | 264—104 |
| 3,160,159 | 12/1964 | Hoody et al. | 128—420 |
| 3,194,860 | 7/1965 | Ehrreich | 264—104 XR |
| 3,255,753 | 6/1966 | Wing | 128—421 |

FOREIGN PATENTS

| | | |
|---|---|---|
| 1,177,325 | 12/1958 | France. |
| 1,350,877 | 12/1963 | France. |
| 943,512 | 12/1963 | Great Britain. |

RICHARD A. GAUDET, Primary Examiner

K. L. HOWELL, Assistant Examiner

U.S. Cl. X.R.

128—416, 418